United States Patent [19]

Oetting et al.

[11] Patent Number: 4,499,965

[45] Date of Patent: Feb. 19, 1985

[54] HYBRID DRIVE ARRANGEMENT

[75] Inventors: Hermann Oetting, Brunswick; Paulus Heidemeyer, Wolfsburg, both of Fed. Rep. of Germany

[73] Assignee: Volkswagenwerk Aktiengesellschaft, Wolfsburg, Fed. Rep. of Germany

[21] Appl. No.: 377,609

[22] Filed: May 13, 1982

[30] Foreign Application Priority Data

Jul. 4, 1981 [DE] Fed. Rep. of Germany ....... 3126487

[51] Int. Cl.³ .............................................. B60K 9/04
[52] U.S. Cl. ..................................... 180/165; 74/572
[58] Field of Search ............... 180/165; 74/572, 571, 74/573, 751; 60/476

[56] References Cited

U.S. PATENT DOCUMENTS

| | | |
|---|---|---|
| 2,443,770 | 6/1948 | Kasschau ............... 180/165 |
| 2,803,151 | 8/1957 | Clerk ...................... 180/165 |
| 3,734,222 | 5/1973 | Bardwick ............... 74/751 |
| 3,771,311 | 11/1973 | Herbst ................... 180/165 |
| 3,858,674 | 1/1975 | Tabor ..................... 180/165 |
| 3,886,810 | 6/1975 | Sugiyama et al. ..... 180/165 |
| 3,923,115 | 12/1975 | Helling .................. 180/165 |
| 4,116,006 | 9/1978 | Wallis .................... 74/572 |
| 4,131,171 | 12/1978 | Keyes ..................... 74/572 |
| 4,342,371 | 8/1982 | Smitley .................. 180/165 |
| 4,346,773 | 8/1982 | Houfbauer ............. 74/572 |

FOREIGN PATENT DOCUMENTS 2931513 3/1980 Fed. Rep. of Germany .
2933542 2/1981 Fed. Rep. of Germany .

OTHER PUBLICATIONS

Department of the Army Technical Manual, "Principles of Automotive Vehicles", Jan. 1956, TM 9-8000, pp. 49-50, 52.

*Primary Examiner*—David M. Mitchell
*Attorney, Agent, or Firm*—Brumbaugh, Graves, Donohue & Raymond

[57] ABSTRACT

The invention concerns a hybrid drive arrangement for vehicles, with an engine drive and with a flywheel storage drive, which includes a storage flywheel supported concentrically relative to the crankshaft for storing kinetic energy during such operations as braking operations of the vehicle. Both drives can be connected with the driving wheels of the vehicle by means of a common, preferably continuously variable, transmission. In order to obtain a faster response of the engine drive on suddenly occurring power demands and in order to achieve a more favorable design of the storage flywheel, there is to be provided in accordance with the invention, in addition to a storage flywheel, an engine flywheel associated with the reciprocating-piston internal combustion engine, which compensates for torque irregularities of the engine. The engine flywheel can be connected with a crankshaft by means of a first clutch and with the storage flywheel by means of at least one further clutch.

5 Claims, 3 Drawing Figures

HYBRID DRIVE ARRANGEMENT

BACKGROUND OF THE INVENTION

This invention relates to vehicles in which the driving power from the conventional engine drive may be supplemented by kinetic energy stored in a rotating flywheel drive, i.e., vehicles having a hybrid drive arrangement.

An example of a hybrid drive arrangement is given in German patent application DE-AS No. 29 33 542. In this type of hybrid drive arrangement, the storage flywheel is the same element as the engine flywheel and there is a clutch located between the flywheel (which is normally present in reciprocating piston type engines to equalize non-uniformities of engine output torque and prevent stalling at idling) and the engine crankshaft. However, this dual-purpose flywheel, which is a storage flywheel and an engine flywheel, must have a substantially larger mass moment of inertia than a conventional engine flywheel, which need only have sufficient mass to compensate for the torque irregularities of the crankshaft, if a sufficient amount of kinetic energy to help drive the vehicle is to be available. If a flywheel with a large mass moment of inertia is used, the vehicle will operate sluggishly on acceleration, since the engine must accelerate not only the vehicle, but also the heavy storage flywheel.

SUMMARY OF THE INVENTION

The present invention is a hybrid drive arrangement with a storage flywheel drive that allows a fast and spontaneous response of the engine to sudden increases in power demand and that at the same time provides a favorable arrangement for kinetic energy storage on braking of the vehicle.

More particularly, the invention is a hybrid drive arrangement for a vehicle which includes an engine with a crankshaft, a flywheel storage drive with a storage flywheel, a transmission, an engine flywheel, means for coupling the engine and the storage flywheel to the transmission, and means for coupling the engine flywheel to the storage flywheel. Due to the separate arrangement of the storage flywheel and the engine flywheel, in which the engine flywheel can be connected with the crankshaft of the engine by a clutch and with the storage flywheel by means of at least one further clutch, each flywheel can better perform its particular function. Consequently, by designing the engine flywheel in accordance with the conventional requirements for this component, the driving engine can be accelerated rapidly to such speeds as permit a large power output. The size of the disconnectable storage flywheel can be chosen so that a favorable amount of kinetic energy can be stored when possible, for example on braking of the vehicle, and determination of the optimal rotational speed of the storage flywheel is not restricted by or limited to engine rpm.

The ability to disconnect the engine flywheel from the crankshaft permits a favorable mode of operation of the driving engine during braking or idling whereby the engine flywheel can continue to run uncoupled following disconnection independently of the storage flywheel and can restart the engine by engagement of the first clutch after braking or idling.

Preferably, the engine flywheel is mounted on an intermediate shaft and is coupled to the engine by a clutch and is coupled to the transmission by another clutch, and the storage flywheel is connected to either the intermediate shaft or the transmission by still another clutch. The storage flywheel may be rotatably supported on the intermediate shaft or on the transmission input shaft or on a stationary housing. In the preferred embodiment, the transmission used is of the type having a continuously variable transmission ratio.

DESCRIPTION OF THE PREFERRED EMBODIMENTS

Figure 1:
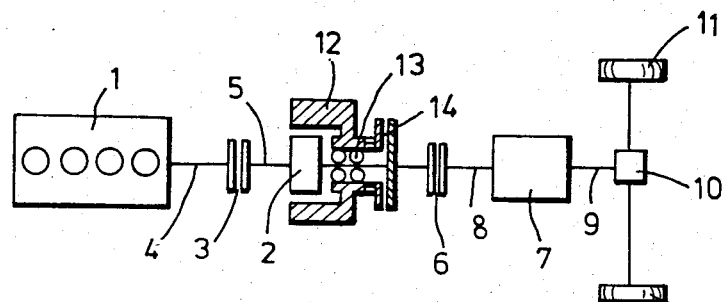
FIG. 1 is a diagrammatic illustration of a hybrid drive arrangement in accordance with the present invention.
Figure 2:
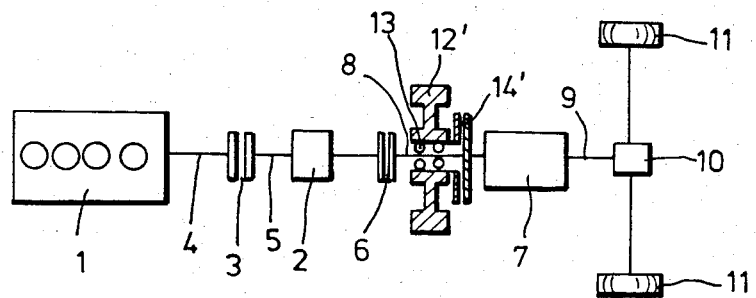
FIG. 2 is a diagrammatic illustration of an alternative embodiment of a hybrid drive arrangement in accordance with the invention.

In FIGS. 1 and 2, a drive engine 1, e.g., a four-cylinder reciprocating-piston internal combustion engine, with a crankshaft 4 is connected by a first clutch 3 with an intermediate shaft 5 provided with a conventional engine flywheel 2. The engine flywheel 2 has sufficient mass so as to compenstate for non-uniformities in engine output torque, which are inherent in conventional reciprocating-piston crankshaft engines.

In the embodiment shown in FIG. 1, a storage flywheel 12 is rotatably supported on the intermediate shaft 5 by a bearing 13. The storage flywheel 12 stores kinetic energy, in particular during braking operations of the vehicle, and may be selectively coupled to the intermediate shaft 5 by a second clutch 14. A third clutch 6 connects the intermediate shaft 5 with the input shaft 8 of a transmission 7, preferably having a continuously variable transmission ratio, whose output shaft 9, by way of a differential gear unit 10, drives the driving wheels 11 of the vehicle.

FIG. 2 illustrates an alternative embodiment of a hybrid drive arrangement. There, the storage flywheel 12' is supported on the transmission input shaft 8 and can be coupled with the shaft 8 by the second clutch 14'.

In both embodiments, the engine flywheel 2 and the storage flywheel 12 are separate components. The inertial mass of each, therefore, can be selected independently as required to perform its individual function. The resultant operation of a vehicle equipped with a hybrid drive arrangement of this kind is correspondingly improved. Since the two flywheels are separate, the storage flywheel can be uncoupled from the drive train during periods of vehicle acceleration. A more spontaneous response of the driving engine results on demand for sudden power increases because the storage flywheel can be uncoupled and the driving engine will not have to accelerate the storage flywheel, which has a large moment of inertia. The storage flywheel can now be designed with a sufficiently large moment of inertia and not be limited by the internal combustion engine as regards its rotational speed.

Moreover, the separation of the engine flywheel 2 from the crankshaft 4 of the driving engine 1 by means of the first clutch 3 facilitates a more favorable manner of operation of the engine drive. By way of example, during engine-braking states and also during stoppages of the vehicle due to traffic conditions, the engine flywheel 2 can be disconnected by clutch 3 from the engine 1 so that the engine stops, conserving fuel. When the engine 1 is again needed to power the vehicle, the clutch 3 is re-engaged, and the stored kinetic energy in the flywheel 2 restarts the engine. Since the engine flywheel can be disconnected both from the storage flywheel 12 and from the drive train (through disengagement of the clutches 3 and 6), it can continue to run over a longer period while the engine is stopped and can still be used for re-starting the stopped engine when desired.

Initial starting of the engine may also be effected by a starter motor (not shown) which acts on the engine flywheel 2 while the clutches 3, 6 and 14 are disengaged, so that the flywheel 2 is freely spinning. The starter motor first accelerates the engine flywheel 2 to a rotational speed which is high enough to start the stopped engine 1, whereupon clutch 3 is engaged. After the driving engine 1 has been started, the vehicle is started by engaging the third clutch 6. Thereafter, the storage flywheel 12 is selectively coupled into the drive train by engagement of the clutch 14, as occurs in normal operation of a hybrid drive, for either accelerating the storage flywheel 12 for storing excess energy, or for driving the vehicle with the stored rotational kinetic energy. The starter motor may also be utilized to selectively drive the engine flywheel 2 to prevent the engine flywheel rpm from falling below a predetermined minimum during periods of engine stoppage (engine braking, idling and the like).

If a continuously variable transmission 7 is used in the driving assembly, the third clutch 6 is theoretically not needed, since an ideal transmission of this type provides an "infinite" speed ratio. However, practically, such a clutch is useful in order to avoid frictional losses that could occur in the transmission when the vehicle is at a standstill and the flywheels are turning.

Figure 3:
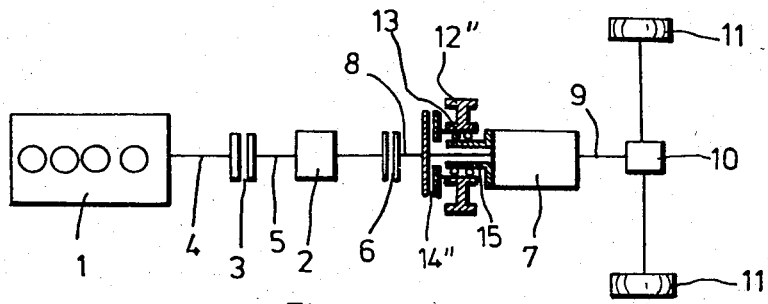
FIG. 3 is a schematic illustration of a portion of a third embodiment of a hybrid drive arrangement.

In the embodiments shown in FIGS. 1 and 2, the storage flywheel 12 and 12', respectively, are supported on a rotating component, namely, either the intermediate shaft 5 or the transmission input shaft 8. However, as shown in FIG. 3, the storage flywheel 12" may be supported directly on a stationary housing 15, for example, mounted on the transmission housing 7, to be connected with the transmission input shaft via the second clutch 14, similar to the embodiment shown in FIG. 2.

Theoretically, it is also possible to dispense with the first clutch 3 and thus to arrange the engine flywheel directly on the crankshaft. In such a case, the aforementioned favorable vehicle operating mode, in which the engine is stopped during engine braking and idling states by disconnecting the engine flywheel, could not be realized in the same manner. The storage flywheel could still be used for restarting a stopped driving engine. Although, under certain conditions, the storage flywheel may rotate at speeds which are higher than the maximum allowable engine speed.

The foregoing represents the preferred embodiment of the invention. Variations and modification of the foregoing embodiments will be apparent to persons skilled in the art without departing from the inventive concepts disclosed herein. All such modifications and variations are intended to be within the scope of the invention as defined in the following claims.

We claim:

1. A hybrid drive arrangement for a vehicle, which comprises:
   an engine having a crankshaft;
   a flywheel storage drive means having a storage flywheel supported to rotate concentrically with the crankshaft, for storing kinetic energy particularly during vehicle braking conditions;
   a transmission for driving drive wheels of a vehicle;
   an engine flywheel for equalizing nonuniformities of engine output torque;
   means for selectively coupling said engine and said storage flywheel to said transmission, the coupling means including first clutch means for coupling said crankshaft and said engine flywheel; and second clutch means for coupling said engine flywheel and said storage flywheel, wherein said transmission has an input shaft comprising an intermediate shaft carrying said engine flywheel, wherein said storage flywheel is supported on said intermediate shaft, wherein said first clutch means is arranged to couple said crankshaft and said intermediate shaft, wherein said second clutch means is arranged to couple said storage flywheel and said intermediate shaft, and comprising further third clutch means for coupling said input shaft and said intermediate shaft.

2. A hybrid drive arrangement for a vehicle, which comprises:
   an engine having a crankshaft;
   a flywheel storage drive means having a storage flywheel supported to rotate concentrically with the crankshaft, for storing kinetic energy particularly during vehicle braking conditions;
   a transmission for driving drive wheels of a vehicle;
   an engine flywheel for equalizing nonuniformities of engine output torque;
   means for selectively coupling said engine and said storage flywheel to said transmission, the coupling means including first clutch means for coupling said crankshaft and said engine flywheel; and second clutch means for coupling said engine flywheel and said storage flywheel, wherein said transmission has an input shaft and said drive comprises a housing, wherein the storage flywheel is supported on said housing, and wherein said second clutch means is arranged to couple said storage flywheel and said input shaft.

3. A hybrid drive arrangement for a vehicle, which comprises:
   an engine having a crankshaft;
   a flywheel storage drive means having a storage flywheel supported to rotate concentrically with the crankshaft, for storing kinetic energy particularly during vehicle braking conditions;
   a transmission for driving drive wheels of a vehicle;
   an engine flywheel for equalizing nonuniformities of engine output torque;
   means for selectively coupling said engine and said storage flywheel to said transmission, the coupling means including first clutch means for coupling said crankshaft and said engine flywheel; and second clutch means for coupling said engine flywheel and said storage flywheel, wherein said transmission has an input shaft and wherein the selective coupling means comprises third clutch means for coupling said engine flywheel and said input shaft, and further comprising a housing, wherein the storage flywheel is supported on said housing, and wherein said second clutch means is arranged to couple said storage flywheel and said input shaft.

4. A hybrid drive arrangement for a vehicle, which comprises:
   an engine having a crankshaft;

a flywheel storage drive means having a storage flywheel supported to rotate concentrically with the crankshaft, for storing kinetic energy particularly during vehicle braking conditions;

a transmission for driving drive wheels of a vehicle;

an engine flywheel for equalizing nonuniformities of engine output torque;

first clutch means for coupling said crankshaft and said engine flywheel; and further clutch means for selectively coupling said engine or said storage flywheel to said transmission, wherein said transmission has an input shaft and wherein said further clutch means includes second clutch means for coupling said storage flywheel and said engine flywheel; and third clutch means for coupling said engine flywheel and said input shaft, wherein said transmission has an input shaft, wherein said engine flywheel is carried on an intermediate shaft, wherein said storage flywheel is supported on said intermediate shaft, wherein said first clutch means is arranged to couple said crankshaft and said intermediate shaft, wherein said second clutch means is arranged to couple said storage flywheel and said intermediate shaft, and wherein said third clutch means is arranged to couple said input shaft and said intermediate shaft.

5. A hybrid drive arrangement for a vehicle, which comprises:

an engine having a crankshaft;

a flywheel storage drive means having a storage flywheel supported to rotate concentrically with the crankshaft, for storing kinetic energy particularly during vehicle braking conditions;

a transmission for driving drive wheels of a vehicle;

an engine flywheel for equalizing nonuniformities of engine output torque;

first clutch means for coupling said crankshaft and said engine flywheel; and further clutch means for selectively coupling said engine or said storage flywheel to said transmission, wherein said transmission has an input shaft and said drive comprises a housing, wherein the storage flywheel is supported on said housing, and wherein said further clutch means includes second clutch means for coupling said storage flywheel and said input shaft and third clutch means for coupling said engine flywheel and said input shaft.

* * * * *